United States Patent [19]

Koester et al.

[11] 4,133,911

[45] Jan. 9, 1979

[54] MANUFACTURE OF MAGNETIC DISCS

[75] Inventors: Eberhard Koester, Frankenthal; Paul Deigner, Weisenheim; Roland Falk, Achern; Karl Uhl, Frankenthal; Dieter Schaefer, Ludwigshafen; Dieter Mayer, Ludwigshafen; Herbert Motz, Ludwigshafen; Peter Felleisen, Lampertheim, all of Fed. Rep. of Germany

[73] Assignee: BASF Aktiengesellschaft, Ludwigshafen, Fed. Rep. of Germany

[21] Appl. No.: 641,356

[22] Filed: Dec. 16, 1975

[30] Foreign Application Priority Data

Dec. 17, 1974 [DE] Fed. Rep. of Germany ....... 2459541

[51] Int. Cl.² ............................................. H01F 10/02
[52] U.S. Cl. ..................................... 427/130; 427/128
[58] Field of Search ........................ 427/209, 127-132, 427/48, 240

[56] References Cited

U.S. PATENT DOCUMENTS

| | | | |
|---|---|---|---|
| 2,744,034 | 5/1956 | Dalton et al. | 427/240 X |
| 3,198,657 | 8/1965 | Kimball et al. | 117/101 |
| 3,705,048 | 12/1972 | Staunton | 118/52 X |
| 3,730,760 | 5/1973 | Machmiller | 427/207 |

FOREIGN PATENT DOCUMENTS 2157650  0000 Fed. Rep. of Germany.

OTHER PUBLICATIONS

"Advances in Applied Mechanics" vol. 4 (IV), Academic Press, 1956, p. 159 et seq.

*Primary Examiner*—Bernard D. Pianalto
*Attorney, Agent, or Firm*—Keil, Thompson & Shurtleff

[57] ABSTRACT

The invention relates to an improved process for the manufacture of magnetic discs carrying very thin magnetic layers, by applying a fluid dispersion of magnetic materials in a binder mixture to rigid base discs by the spin-coating process. Above the side of the base disc which is to be provided with the magnetic layer, there are arranged means which produce an aerodynamic boundary layer above the discs during rotation of the latter. This avoids the formation of surface irregularities and of coating streaks during production of the layer by spin-coating.

8 Claims, 5 Drawing Figures

MANUFACTURE OF MAGNETIC DISCS

The present invention relates to an improved process for the manufacture of magnetic discs carrying very thin magnetic layers, by applying a fluid dispersion of magnetic materials in a binder mixture to rigid base discs by the spin-coating process whilst taking special measures to avoid the occurrence of surface irregularities and coating streaks.

Magnetic recording media in the form of rotating discs are extensively used as memories which allow rapid access to any desired position. Two important factors relating to such disc memories are the amount of information which can be stored thereon, which is usually described as the recording density and is expressed in bits per inch, and their magnetic properties, which influence the output signals of the magnetic disc. The achievable recording density depends on the thickness of the magnetic coating. The thinner the coating, the higher the recording density can be. With $6\mu$ magnetic coatings, a recording density of about 1,000 bits per inch is achieved, whilst with $4\mu$ magnetic coatings the achievable recording density is about 2,000 bits per inch. However, there is a growing demand for magnetic discs which permits an even higher recording density whilst retaining an output signal which is suitable for further processing. If these very thin magnetic coatings are used, the heads, which fly on a layer of air which is present between the magnetic disc and the head, have to be brought closer to the recording medium. In the case of magnetic discs which have a magnetic layer about $1\mu$ thick, the distance between the flying head the disc surface is so small (the distance being only from 0.2 to $0.6\mu$) that the recording surface must be extremely flat. Moreover, the thickness of the magnetic layer of such disc memories must be absolutely constant. A varying thickness of the magnetic layer, and surface irregularities and coating streaks must be avoided since even minute irregularities in the surface of the magnetic layer can interfere with the flying behavior of the head and lead to a non-uniform signal level and/or can cause the head to strike the disc and hence give rise to faulty operation.

It is known to manufacture disc memories by coating an aluminum disc with a fluid dispersion which contains a magnetizable material finely dispersed in a curable binder, and subsequently drying and/or curing this coating and, if desired, also grinding and/or polishing it. A coating technique which has proved particularly successful is the spin-coating process, in which the base disc is caused to rotate and the coating mixture is allowed to flow onto it, as is described, e.g., in U.S. Pat. No. 3,198,657. Other known possible methods of applying the dispersion are based on immersing the base disc in the fluid coating mixture or spraying the mixture onto the disc. To achieve a thin magnetic layer, the excess dispersion which has been applied is then spun off.

None of the conventional processes prevents the formation of coating streaks. The high rotational speeds, which are required to produce particularly thin magnetic layers, favor the formation of coating streaks which resemble a bucket wheel. It is usual, after curing, to finely polish the surface of the magnetic layer in order to even out irregularities and produce a magnetic layer of constant thickness. However, it has been found that these coating streaks cannot be removed, even by the most intensive polishing treating, to such an extent that a usuable disc memory is produced.

It is an object of the present invention to provide an improved process for the manufacture of magnetic discs carrying thin magnetic layers, in which the base discs are spin-coated whilst avoiding the formation of the coating streaks which usually occur in the production of thin layers.

We have found that this object is achieved and that thin magnetic layers, free from coating streaks, for magnetic discs can be produced by applying a pourable dispersion of a finely divided magnetic pigment in a solution of an organic binder in a volatile solvent, distributing the dispersion over the disc surface to form a thin layer thereon, by rotating the base disc, and drying and curing the layer, if means for producing an aerodynamic boundary layer above the disc during rotation of the latter are arranged above the side of the base disc bearing the applied dispersion.

In particular, we have found that the object of the invention is achieved in a very advantageous manner if a rigid covering element whose surface area is at least equal to that of the base disc is located at a distance of up to 20 mm above the surface of the base disc which is to be coated; this covering element, when also caused to rotate, produces the aerodynamic boundary layer which achieves the effect provided by the invention.

In a preferred embodiment of the invention, two base discs to be provided with a magnetic layer are arranged at a distance of up to 20 mm from one another and the dispersion is applied simultaneously to the two sides facing each other, and the two magnetic layers are produced by subsequent rotation within the aerodynamic boundary layer which is formed.

In the production of magnetic coatings for magnetic discs, a suitable method has proved to be to pour the dispersion, containing the magnetic pigment, radially onto the slowly rotating base disc and then to distribute the dispersion over the base disc by rotating it at high speed.

Suitable magnetic dispersions are the conventional dispersions which usually contain finely divided magnetic pigments, (e.g. gammairon(III) oxide, magnetite or ferromagnetic metal) with particle sizes of from about 0.2 to $1\mu$, and binders, especially heatcurable binders, e.g. epoxy resins, phenoxy resins, aminoplast precondensates, polyester resins, polyurethanes or polyurethane-forming compounds, or mixtures of such binders with one another or with other binders, such as polycarbonates or vinyl polymers, e.g. vinyl chloride or vinylidene chloride copolymers or heat-curable acrylate or methacrylate copolymers. In general, the magnetic dispersions also contain volatile solvents to produce a dispersion which can readily be poured or sprayed through nozzles, e.g. tetrahydrofuran, toluene, methyl ethyl ketone and the like, the type of solvent used depending, inter alia, on the binder employed. Suitable magnetic dispersions for the process of the invention preferably have viscosities of from about 40 to 200 cp, preferably 60 to 150 cp (measured in a Rheomat 15, Model No. RM 15 C/01, manufactured by Messrs. Contraves, Zurich, Switzerland). The weight ratio of magnetic pigment to binder is generally from 2 to 10:1, especially from 3 to 5:1. The magnetic dispersions can be produced by conventional methods using conventional additives, e.g. dispersing agents and lubricants.

After cleaning the base discs with solvent, the magnetic dispersion is advantageously applied or sprayed from nozzles by the spin-coating process, wherein an excess of magnetic dispersion is sprayed onto the disc from nozzles which can be moved parallel to the disc surface over the radius of the disc; during spraying, the nozzles move from the inner edge to the outer edge of the disc or preferably from the outer edge to the inner edge and then from the inner edge to the outer edge. As is well known, during spin-coating the discs rotate at a speed of from 400 to 3,500 rpm, the speed selected in each particular case depending, inter alia, on the viscosity of the magnetic dispersion and the diseired thickness of the resulting magnetic layers. The thickness of the finished dried magnetic layers is in the range of from 1 to $10\mu$ and in particular of from 1 to $3\mu$, the thinner magnetic layers being produced by selecting high rotational speeds, at least during spinning off the excess dispersion, and/or selecting low viscosities of the magnetic dispersions.

Because of the conditions employed in producing very thin magnetic layers, the formation of coating streaks which have the appearance of a bucket wheel is unavoidable. In the case of the desired layer thicknesses, such streaks cannot be removed, even by an intensive polishing treatment, to such an extent that the signal level exhibits the required uniformity.

The process according to the invention employs means which produce an aerodynamic boundary layer above the disc to be coated, as a result of which extemely uniform thicknesses and flat surfaces are achievable even in the case of very thin layers.

If a disc rotates in a stationary air space, a flow of air is produced on each side of the disc, and the radial, tangential and axial components of this flow can be determined by means of the Navier-Stokes equations. Immediately above the surface of the disc, a boundary layer is formed, within which the air closest to the disc surface is stationary relative to said surface, i.e., rotates with the disc.

The boundary layer according to the invention is distinguished by much greater stability and thickness, being stationary, with respect to the rotating disc, over the entire distance between the coated base disc and the covering element. This ensures that the applied layer is not adversely affected by the air flow whilst it is still fluid or is drying slowly.

The mathematical relationship which apply to three-dimensional boundary layers are discussed in detail in "Advances in Applied Mechanics", Vol. IV, Academic Press, 1956, page 159 et seq.

BRIEF DESCRIPTION OF THE DRAWING

The accompanying drawings illustrate, by way of example, three embodiments of the process according to the invention.

DETAILED DESCRIPTION

Figure 1:
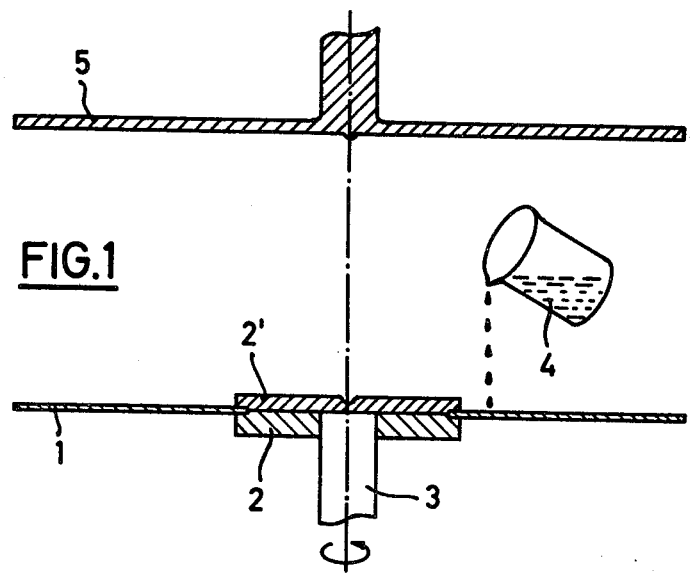

In FIG. 1, the base disc 1 which is to be coated is fastened by means of holder members 2 and 2' to the drive shaft 3 of a variable-speed electric motor. The dispersion 4 is poured onto the slowly rotating base disc. Thereafter, a covering element 5 is placed upon holder member 2' above the base disc and is consequently caused to rotate together with the holder members 2 and 2'; the motor speed is then raised so as to distribute the dispersion uniformly over the base disc and spin off the excess dispersion.

Figure 2:
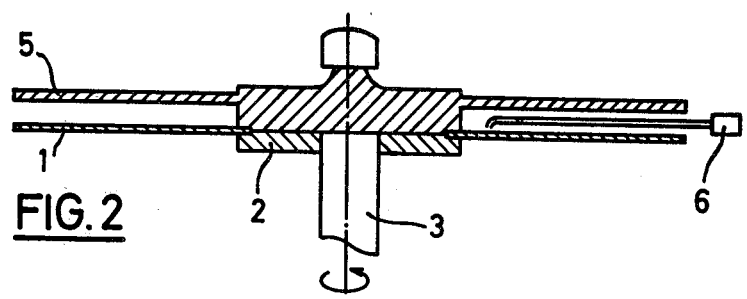
FIGS. 2 and 3 show particularly advantageous embodiments.

Another suitable arrangement for carrying out the process of the invention is shown in FIG. 2. Here, the base disc 1 is held by a holder consisting of the member 2 fixed on the drive shaft 3, and a further member forming the covering element 5. In this embodiment, the dispersion is applied to the base disc by a nozzle 6 which is movable at right angles to the axis of rotation of the disc. Uniform distribution of the dispersion over the base disc is effected in the conventional manner.

Figure 3:
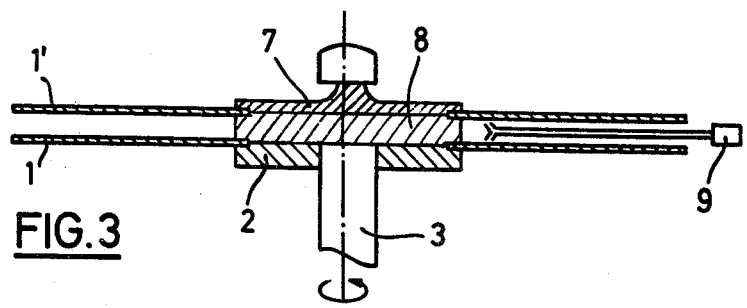

The embodiment shown in FIG. 3 has proved particularly advantageous. In this case, two base discs 1 and 1' which are to be coated are held on the shaft 3 by means of the members 2 and 7 and the spacer 8 so that each base disc serves as the covering element for the other. This embodiment is particularly economical in view of the fact that the dispersion can be applied simultaneously to two base disc surfaces by means of the radially movable twin nozzle 9.

The embodiments of the process according to the invention shown in these Figures only represent some of the possibilities. It is obvious, and at times even desirable, that the plane of rotation should not be horizontal, as shown in the Figures, but should be inclined at an angle to the vertical plane, as described, e.g., in German Pat. No. 2,157,650. Furthermore, the rigid covering element used in the process of the invention does not have to be in the form of a flat disc but can for example be profiled on the side facing the surface of the base disc to be coated. It is possible to employ, instead of the covering element, means which generate a rotating column of air above the side of the disc which is to be coated, this column corresponding to an axial extension of the aerodynamic boundary layer by several orders of magnitude.

The advantageous effect of the process of the invention is shown by the Example which follows and a comparative experiment. In these, parts and percentages are by weight, unless stated otherwise. Parts by volume bear the same relation to parts by weight as the liter to the kilogram.

EXAMPLE

A mixture of 35,000 parts of acicular gamma-iron(III) oxide of average particle size from 0.2 to $1\mu$, 4,200 parts of a 50% strength solution of a commercial polycondensate of 2,2-(hydroxyphenyl)-propane and epichlorohydrin, having a melting point of from about 125° to 135° C. and epoxy equivalent weight of from about 1,900 to 2,500, in a mixture of 70% of cyclohexanol and 30% of xylene, 85 parts of a commercial polysiloxane solution, 3,000 parts of toluene and 260 parts of hexanone is dispersed for 40 hours in a porcelain ball mill having a capacity of 30,000 parts by volume and containing 18,000 parts of steatite balls. After adding 700 parts of a commercial curable allyloxybenzene-formaldehyde condensate having a molecular weight of about 320, 640 parts of ®Luwipal 030 (Registered Trademark of BASF Aktiengesellschaft, 6700 Ludwigshafen, Germany) as a melamine-formaldehyde condensate in the form of a 55% strength solution in equal parts of n-butanol and xylene, 500 parts of a 70% strength solution of polyvinyl methyl ether in toluene and 6,000 parts of a mixture of equal parts of hexanone, toluene and butyrolactone, the mixture is dispersed for a further 15 hours. Shortly before the end of the dispersing treatment, 660 parts of fused alumina paste are also added and the dispersion is filtered through a 5μ filter paper.

To produce the magnetic layer, the dispersion is applied, by the process of German Pat. No. 2,157,650, to both sides of a previously cleaned aluminum disc rotating in an inclined plane, flat covering discs which rotate with the aluminum disc being mounted on both sides of the latter. The diameter of the covering discs corresponds to that of the base disc, the distance between them and the base disc being 4 mm. The dispersion is supplied through 2 tubular nozzles in a manner similar to that shown in FIG. 2. The excess magnetic dispersion is spun off by increasing the speed of rotation of the disc, and of the covering elements coupled therewith, to about 2,000 rpm for a period of 5 seconds, and a uniform, streak-free coating is obtained on each side of the base disc. The coatings are then cured in a heating zone at 220° C., after which they are polished. The resulting magnetic layers are about 1.6μ thick.

COMPARATIVE EXPERIMENT

For comparison, an aluminum base disc is coated with the dispersion described in the Example, using the conventional coating process, without a covering disc, and is then further processed as described in the Example.

The discs produced in accordance with the Example and in accordance with the Comparative Experiment were subjected to the following tests.

Visual Assessment

The disc produced in accordance with the Example exhibits a completely uniform, streak-free surface, whilst the disc produced in the Comparative Experiment shows unmistakable coating streaks having the appearance of a bucket wheel.

Flying Characteristics

The flying characteristics were assessed on a conventional test apparatus. The magnetic disc to be examined rotates at 3,600 rpm on a test drive unit. A test head equipped with an acceleration transducer flies above the disc at a height of about 0.75μ and is pushed radially over the surface of the disc during the test. Each irregularity in the disc surface causes a deflection of the test head from its steady flight path. The accelerations associated with these deflections produce electrical signals which are integrated over the test area and are defined as a flight index. A streak-free surface accordingly has a flow flight index.

The magnetic disc produced in accordance with the Example had a relative flight index of 1 (with reference to a reference disc), whereas the magnetic disc produced according to the Comparative Experiment had a relative flight index of 2.5.

Uniformity of signal level

To determine the uniformity of the signal level, the waveform of the written signal is recorded. The magnetic disc rotates at 3,600 rpm on a test drive unit having a flying head. The particularly critical outer track is written with a signal having a frequency of 3.2 Mc/s and the playback signal (read voltage $U_A$) is shown as a function of the recording distance S. From the application point of view, the waveform should be as free from modulation as possible, since this implies uniform electromagnetic properties over the entire length of the track.

Figure 4:
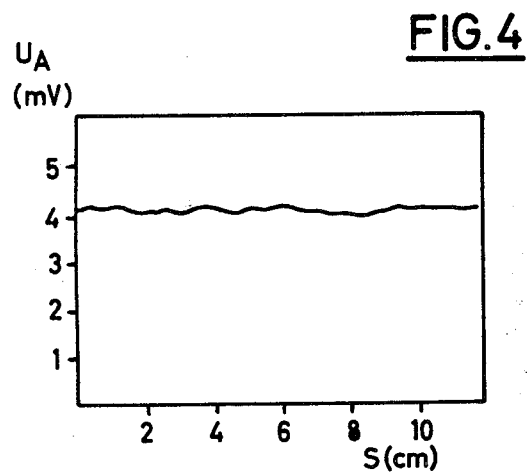
Figure 5:
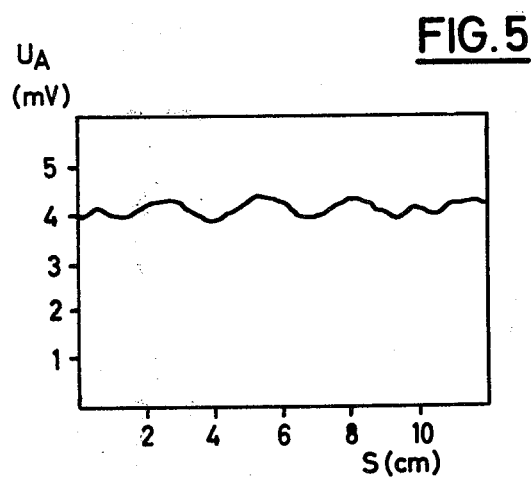

FIG. 4 shows the waveform of a magnetic disc produced by the process of the invention, whereas FIG. 5 shows the waveform of a prior art magnetic disc.

We claim:

1. A process for the production of magnetic layers for magnetic discs which comprises: applying a pourable dispersion of a finely divided magnetic pigment in a solution of an organic binder in a volatile solvent to a rotating base disc, distributing the dispersion to form a thin layer by rotating the base disc, and drying and curing the layer, wherein said process further comprises:
rotating along with said base disc and in substantially parallel, axially-spaced relationship thereto, a separate, rigid, generally disc-shaped member having a surface area which is at least equal to that of the base disc and rotates at a distance of up to 20 mm above the surface of the base disc to be coated, so as to define between the surface of said base disc, on which the magnetic layer is to be formed, and the opposing surface of said member a generally cylindrical air space providing on said surface of said disc an aerodynamic boundary layer which rotates in substantially stationary relationship to said surface of said disc, whereby the formation of coating streaks on said layer is substantially avoided.

2. A process as set forth in claim 1 wherein the dried and cured layer has a thickness of from 1 to 10μ.

3. A process as set forth in claim 1, wherein two base discs are spaced at a distance of up to 20 mm from one another so as to produce an aerodynamic boundary layer therebetween, the dispersion being simultaneously applied to the two facing disc surfaces and a uniform thin layer being formed on each base disc by effecting rotation of the two base discs.

4. A process as set forth in claim 1, wherein the finely divided magnetic pigment has a particle size from about 0.2 to 1μ.

5. A process as set forth in claim 1 wherein the organic binder is a heat curable binder.

6. A process as set forth in claim 1 wherein the dispersion has a viscosity of from 40 to 200 cp.

7. A process as set forth in claim 1 wherein the weight ratio of magnetic pigment to binder is from 2 to 10:1.

8. A process as set forth in claim 1 wherein the dispersion is applied to the rotating disc by pouring or by spraying through nozzles.

* * * * *